Inventors
T. S. BRIGGS
K. R. BROWN
By
Cameron, Kerkam + Sutton
Attorneys

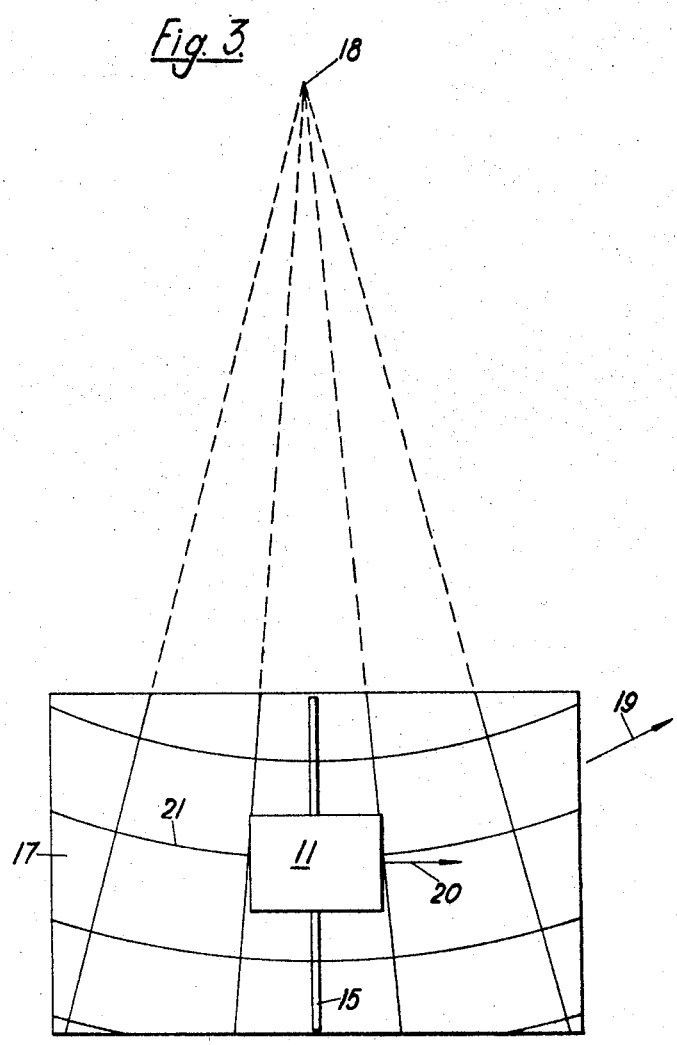

United States Patent Office 3,435,742
Patented Apr. 1, 1969

3,435,742
METHODS OF PRODUCING MAPS AND MEANS THEREFOR
Thomas Stanley Briggs, Edinburgh, and Kenneth Robson Brown, Kirknewton, Midlothian, Scotland, assignors to Ferranti, Limited, Hollinwood, England, a company of Great Britain and Northern Ireland
Filed Jan. 24, 1966, Ser. No. 522,587
Claims priority, application Great Britain, Jan. 29, 1965, 3,933/65
Int. Cl. G03b 29/00
U.S. Cl. 95—12                    8 Claims

ABSTRACT OF THE DISCLOSURE

A map having lines of longitude and latitude arranged as a regular rectangular grid is obtained from a standard map on which the lines of longitude converge to a point off the map by employing an optical system in which a slot is moved relatively to the standard map while an image of an elemental strip of said map is projected through the slot onto a light sensitive surface, the movement comprising rotation between the standard map and the slot about an axis passing through the convergence point, and the light sensitive surface is moved relatively to the slot in a direction normal to the latter in a plane parallel to the plane of the standard map.

---

Figure 1:
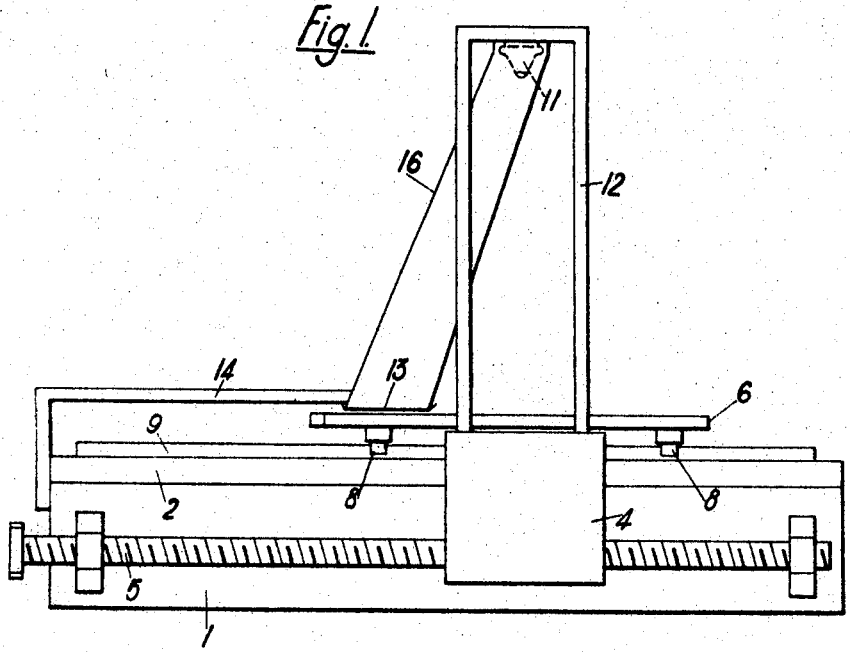

This invention relates to a method of producing a map and to means therefor.

More specifically the invention relates to a method of producing a map having lines of longitude and latitude arranged as a regular rectangular grid from a standard map on which the lines of longitude converge to a point off the map and the lines of latitude are circular arcs centred on said point.

The maps at present most commonly used for aircraft navigation are maps based on a conical projection. When such a map is used in a navigational aid of the kind in which the map is mounted on a carriage adapted to be driven in two mutually perpendicular directions in accordance with the northings and eastings of the craft derived from a navigational computer, errors are introduced in the indicated positions of the craft due to the fact that the lines of longitude on the map are not parallel lines. For accurate navigation, therefore, the drives to the map carriage must be modified to compensate for the convergence of the lines of longitude. Furthermore, an increasing number of navigational computers give outputs representing changes in the longitude and the latitude of the craft and before such outputs can be used to drive the map carriage of a navigational aid of the above kind it is necessary for the outputs to be converted into signals representing changes in velocity or distance travelled by the craft.

For the above reasons it is desirable that maps for use with navigational aids of the above kind which are used in conjunction with a navigational computer giving outputs representing changes in longitude and latitude of the craft should have the lines of longitude and latitude aranged on a regular rectangular grid such that the drives for the map carriage may be derived from the computer outputs without modification.

It is therefore an object of the present invention to provide a method of producing a map having the lines of longitude and latitude arranged on a regular rectangular grid.

According to the present invention a method of producing a map having the lines of longitude and latitude arranged as a regular rectangular grid from a standard map on which the lines of longitude converge to a point off the map and the lines of latitude are circular arcs centred on said point comprises projecting an image of an elemental strip of said standard map onto a light sensitive surface by means of an optical system including a focal plane shutter containing a linear slot which extends in a direction parallel to one of said lines of longitude, causing relative rotation between said standard map and said slot about an axis passing through said point normal to the plane of said standard map, and causing relative movement between said slot and said light sensitive surface in a direction normal to said slot in a plane parallel to the plane of said standard map.

Also in accordance with the present invention means for producing a map having the lines of longitude and latitude arranged as a regular rectangular grid from a standard map on which the lines of longitude converge to a point off the map and the lines of latitude are circular arcs centered on said point comprise an optical system for projecting an image of an elemental strip of said standard map onto a light sensitive surface, said optical system including a focal plane shutter containing a linear slot which extends in a direction parallel to one of said lines of longitude, means for causing relative rotation between said standard map and said slot about an axis passing through said point normal to the plane of said standard map, and means for causing relative movement between said slot and said light sensitive surface in a direction normal to said slot in a plane parallel to the plane of said standard map.

Said light sensitive surface may be a photographic film.

Figure 2:
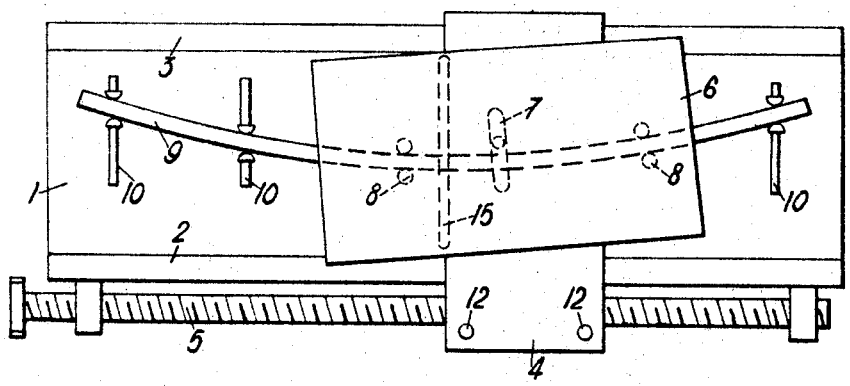

The present invention will now be described by way of example with refernce to the accompanying drawings in which:

FIGURE 1 is a side elevation of apparatus for producing a map in accordance with the invention, FIGURE 2 is a plan view of the apparatus shown in FIGURE 1, and FIGURE 3 is a schematic drawing showing a standard map arranged on the apparatus shown in FIGURUE 1.

Referring now to FIGURES 1 and 2 of the drawings the apparatus shown includes a base 1 having straight guide rails 2, 3 on which a carriage 4 is slidably mounted for linear movement which is caused upon rotation of a lead screw 5. A platform 6 is mounted on the carriage 4 and is coupled thereto by means of a pin and slot coupling 7 (FIGURE 2). The platform 6 is provided with two pairs of rollers 8 which engage a guide rail 9 fixed to the base 1 by adjustable clamps 10 by means of which the guide rail 9 is bent into a circular arc of a desired radius.

A camera 11 is also mounted on the carriage 4 by means of rigid support rods 12. The camera includes an optical system having a focal plane shutter 13 located in the object plane and fixed with respect to the base 1 by means of an arm 14 attached to the base 1. The focal plane shutter contains a slot 15, indicated in broken line in FIGURE 2, and the slot 15 is arranged in the centre of the guide rail 9 such that it always extends in a direction which is radial with respect to the centre of the circular arc into which the guide rail 9 is bent and perpendicular to the guide rails 2 and 3. The shutter 13 is connected to the camera 11 by means of a flexible light-tight bellows 16. For reasons of clarity the camera 11 and the bellows 16 have been omitted from FIGURE 2.

To produce a map having the lines of longitude and latitude arranged as a regular rectangular grid from a standard map based on a conical projection in which the lines of latitude are circular arcs centered on the convergence points the guide rail 9 is bent into a circular arc having a radius equal to the radius of a particular line of latitude which may be on or off the standard map. The standard may is the mounted on the platform 6 such that the lines of latitude and the guide rail 9 are concentric, the carriage 4 being positioned such that the slot 15 in the shutter 13 is at one edge of the area of the map to be produced and parallel to a line of longitude. Thereafter a photographic film contained in the camera 11 is exposed and the carriage 4 driven at a constant speed by means of the lead screw 5.

As the carriage 4 is driven at a constant speed the camera 11 is moved relatively to the slot 15 in a direction normal to the slot 15 in a plane parallel to the plane of the standard may. At the same time the standard map is rotated relative to the slot 15 about an axis passing through the point of convergence of the lines of longitude normal to the plane of the standard map due to the fact that the guide rail 9 is concentric with the lines of latitude on the standard map. This is shown schematically in FIGURE 3 in which the standard map 17 is rotated about the convergence point 18 in the direction of the arrow 19 and the camera 11 is moved in a straight line in the direction of the arrow 20.

If the guide rail 9 is bent to have the same radius as the line of latitude 21 on the standard map 17 the linear velocity of the camera 11 is equal to the circumferential velocity of the line of latitude 21 and points on the line 21 will be reproduced on the photographic film as a straight line parallel to one edge of the film, the only change in scale being that caused by the reduction due to the magnification of the optical system. Asuming that the map is a map of part of the Northern hemisphere, the lines of latitude to the north of the line 21 will have a circumferential velocity which is lower than the linear velocity of the camera 11 and these lines will be reproduced as straight lines parallel to the image of the line 21 but with a scale which is greater in proportion to the difference between the latitude of the line and the latitude of the line 21. Similarly, the lines of latitude to the south of the line 21 will have a circumferential velocity greater than the linear velocity of the camera 11 and will therefore be reproduced as straight lines parallel to the image of the line 21 but with a scale which is smaller in proportion to the difference between the latitude of the line and the latitude of the line 21. Since the slot 15 is initially parallel to a line of longitude, the other lines of longitude become parallel to the slot 15 as the map is rotated and the lines of longitude are reproduced as equispaced straight lines perpendicular to the lines of latitude without any change in scale other than that due to the magnification of the optical system.

The standard map is therefore reproduced as a map having the lines of longitude and latitude arranged as a regular rectangular grid. There is some distortion of land shapes due to the changes of scale but this is not found to be serious. Other maps may be produced having their lines of longitude and latitude on the same regular rectangular grid by maintaining the curvature of the guide rail 9 constant. Thus for a map to the south of the standard map 17 the guide rail 9 will still have a curvature of radius equal to the radius of the line of latitude 21, i.e. a line of latitude which is off the map, and the lines of latitude will therefore all have a radius which is greater than the radius of the guide rail 9. The whole map will therefore have a smaller scale than that produced from the map 17 but the lines of longitude and latitude will be on the same regular rectangular grid.

The apparatus described above may be modified in many ways. For example, the relative movement between the camera 11 and the slot 15 may be obtained by moving the slot 15 instead of the camera 11, but since the slot must always be parallel to a line of longitude, the point 18 must also be moved linearly at the same velocity as the slot 15. Furthermore, the focal plane shutter 13 could be located in the image plane instead of the object plane as described above. Also, a light sensitive surface other than photographic film could be used. The map could be produced, for example, using a xerographic process.

What we claim is:

1. A method of producing a map having the lines of longitude and latitude arranged as a regular rectangular grid from a standard map on which the lines of longitude converge to a point off the map and the lines of latitude are circular arcs centred on said point comprising projecting an image of an elemental strip of said standard map onto a light sensitive surface by means of an optical system including a focal plane shutter containing a linear slot which extends in a direction parallel to one of said lines of longitude of said standard map, causing relative rotation between said standard map and said slot about an axis passing through said point normal to the plane of said standard map, and causing relative movement between said slot and said light sensitive surface in a direction normal to said slot in a plane parallel to the plane of said standard map.

2. Means for producing a map having the lines of longitude and latitude arranged as a regular rectangular grid from a standard map on which the lines of longitude converge to a point off the map and the lines of latitude are circular arcs centred on said point comprising an optical system for projecting an image of an elemental strip of said standard map onto a light sensitive surface, said optical system including a focal plane shutter containing a linear slot which extends in a direction parallel to one of said lines of longitude of said standard map, means for causing relative rotation between said standard map and said slot about an axis passing through said point normal to the plane of said standard map, and means for causing relative movement between said slot and said light sensitive surface in a direction normal to said slot in a plane parallel to the plane of said standard map.

3. Means as claimed in claim 2 in which said means for causing relative movement includes a carriage movably mounted on a fixed base and constrained to move linearly with respect to said base.

4. Means as claimed in claim 2 in which said means for causing relative rotation includes a platform for carrying said standard map, said platform being movably mounted on a fixed base and constrained to move in a circular arc.

5. Means as claimed in claim 4 in which said fixed base includes a guide rail in the form of a circular arc for carrying said platform.

6. Means as claimed in claim 5 in which said means for causing relative movement includes a carriage movably mounted on said fixed base and constrained to move linearly with respect to said base, and coupling means coupling said platform to said carriage such that movement of said carriage causes movement of said platform.

7. Means as claimed in claim 6 in which said coupling means comprises a pin and slot coupling.

8. Means as claimed in claim 6 in which said focal plane shutter is in the object plane and fixed with respect to said base, and said light sensitive surface is fixed with respect to said carriage.

References Cited

UNITED STATES PATENTS 3,126,809   3/1964   Adams et al. _____ 95—75

NORTON ANSHER, *Primary Examiner.*

R. A. WINTERCORN, *Assistant Examiner.*

U.S. Cl. X.R.

355—52